(12) United States Patent
De Loye et al.

(10) Patent No.: US 6,996,370 B2
(45) Date of Patent: Feb. 7, 2006

(54) METHOD FOR HANDLING CALLS RECEIVED AT A WIRELESS MOBILE TERMINAL COMPRISING A SHORT-RANGE INTERFACE, CORRESPONDING WIRELESS MOBILE TERMINAL AND COMPUTER PROGRAM

(75) Inventors: Martin De Loye, Sevres (FR); Jean-Francois Deprun, Paris (FR)

(73) Assignee: Alcatel, Paris (FR)

( * ) Notice: Subject to any disclaimer, the term of this patent is extended or adjusted under 35 U.S.C. 154(b) by 656 days.

(21) Appl. No.: 10/054,910

(22) Filed: Jan. 25, 2002

(65) Prior Publication Data

US 2002/0115471 A1 Aug. 22, 2002

(30) Foreign Application Priority Data

Feb. 19, 2001 (EP) .................................. 01440039

(51) Int. Cl.
*H04B 7/00* (2006.01)
(52) U.S. Cl. ..................... 455/41.2; 455/417; 455/420; 455/445; 455/442.1
(58) Field of Classification Search ................ 455/522, 455/414, 459, 556–557, 566–569, 552–553, 455/412–417, 90, 422, 525, 41.2, 41.1, 552.1, 455/553.1, 903.1, 414.1, 414.2, 412.1–420, 455/422.1, 414.3, 414.4, 912.1, 912.2, 413, 455/550.1, 445, 444, 404.2, 424–425, 426.1, 455/435.2, 456.4, 1, 211.01, 212.02; 379/211.02, 379/211.07, 456.5–456.6; 370/352–354, 370/392–394
See application file for complete search history.

(56) References Cited

U.S. PATENT DOCUMENTS

| | | | | |
|---|---|---|---|---|
| 5,894,595 | A | * | 4/1999 | Foladare et al. .......... 455/556.2 |
| 6,134,433 | A | * | 10/2000 | Joong et al. ................ 455/417 |
| 6,188,758 | B1 | * | 2/2001 | Christensen et al. ... 379/211.02 |
| 6,442,404 | B1 | * | 8/2002 | Sakajiri ...................... 455/557 |
| 6,590,969 | B1 | * | 7/2003 | Peters et al. ........... 379/211.02 |

FOREIGN PATENT DOCUMENTS

| | | |
|---|---|---|
| EP | 1 017 210 A1 | 7/2000 |
| WO | WO 99/22493 | 5/1999 |

* cited by examiner

*Primary Examiner*—Pablo N. Tran
(74) *Attorney, Agent, or Firm*—Sughrue Mion, PLLC

(57) ABSTRACT

The invention relates notably to a method for handling calls received from a radio communication network at a wireless mobile terminal, the wireless mobile terminal comprising at least one short-range interface for communicating with office devices located under the range of the short-range interface, According to the invention, the method consists in:
identifying at the wireless mobile terminal office devices located under the range of the short-range interface and able to handle at least one call type belonging to a list of predefined call types;
upon reception of a call from the radio communication network at the wireless mobile terminal, the call having a call type belonging to the predefined list, selecting an office device able to handle the call type; and
forwarding the call to this office device.

6 Claims, 2 Drawing Sheets

METHOD FOR HANDLING CALLS RECEIVED AT A WIRELESS MOBILE TERMINAL COMPRISING A SHORT-RANGE INTERFACE, CORRESPONDING WIRELESS MOBILE TERMINAL AND COMPUTER PROGRAM

BACKGROUND OF THE INVENTION

The present invention relates to call handling in radio communication networks and more particularly to a method for handling calls received from a radio communication network at a wireless mobile terminal comprising a short-range interface.

A mobile wireless terminal dedicated to access to a radio communication network, as for example a GSM mobile phone or third generation UMTS mobile phone and further comprising an interface for short-range communication are known in the art. An example of a such mobile wireless terminal is described in Bluetooth Specification Version 1.0 B page 100 from 1 Dec. 1999 under the name "3-in-1 phone". In that case, the short-range interface is a Bluetooth interface. Bluetooth is a specification that describes how mobile phones, computers, personal digital assistants and other stand-alone devices can easily interconnect with each other using a short-range wireless connection. Each device is equipped with a microchip transceiver that transmits and receives in a frequency band of 2.45 GHz that is available globally (with some variation of bandwidth in different countries). Each device is identified by a unique 48-bit address defined in the Bluetooth standard. Built-in encryption and verification of this unique address is provided for ensuring the connection security.

At home, the "3-in 1 phone" functions as a cordless telephone. On the move, it functions as a cellular telephone. For these two first applications, the mobile telephone uses the usual interface to a radio communication network at home the 3-in-1 phone communicates for example over DECT to a local base station, on the moves, the 3-in-1 phone communicates over GSM.

In a third configuration, when the 3-in-1 phone comes within the range of another mobile phone with built-in Bluetooth technology, it functions as a walkie-talkie and communicates exclusively with the other mobile phone over the Bluetooth interface. In that case, the communication does not require resources from a radio communication network. Moreover, the communication is not billed.

A drawback of this kind of "3-in-1 phone" is that both wireless interfaces are used independently from one another. Either the radio interface to the radio communication network is operative or the short-range interface is operative.

A particular object of the present invention is to enhance the call handling functionality for calls received from a radio communication network at a wireless mobile telephone having a short-range interface.

Another object of the invention is to provide a wireless mobile terminal for performing this method as well as a computer program to be implemented in the wireless mobile terminal for performing the method.

SUMMARY OF THE INVENTION

These objects, and others that appear below, are achieved by a method for handling calls received from a radio communication network at a wireless mobile terminal, said wireless mobile terminal comprising at least one short-range interface for communicating with office devices located under the range of said short-range interface, the method comprising the steps of:
  identifying at said wireless mobile terminal office devices located under the range of said short-range interface each being adapted to handle at least one call type belonging to a list of predefined call types;
  upon reception of a call from said radio communication network at said wireless mobile terminal, said call having a call type belonging to said predefined list, selecting an office device able to handle said call type; and forwarding said call to said office device.

These objects are further attained by a wireless mobile terminal comprising a radio interface to access to a radio communication network and at least one short range interface for communicating with office devices under the range of said short-range interface, said wireless mobile terminal further comprising:
  a module for identifying office devices located under the range of said short-range interface each being adapted to handle at least one call type belonging to a list of predefined call types;
  a module for selecting, upon reception of a call, having a certain call type, from said radio communication network, at least one office device susceptible to handle said call type;
  a module for forwarding said call to said office device.

These objects are also attained by a computer program comprising computer program code means adapted to perform the steps of:
  identifying at said wireless mobile terminal office devices located under the range of said short-range interface each being adapted to handle at least one call type belonging to a list of predefined call types;
  upon reception of a call from said radio communication network at said wireless mobile terminal, said call having a call type belonging to said predefined list, selecting an office device able to handle said call type; and forwarding said call to said office device, said computer program being stored in a wireless mobile terminal comprising a first radio interface and a second short range interface of communicating with office devices located under the range of said short-range interface.

According to the present invention, calls received from a radio communication network at a wireless mobile terminal comprising a short-range interface are handled by taking into account the environment of the wireless mobile terminal. The wireless mobile terminal identifies its environment thanks to communication over its short range interface with office devices located at its proximity. Then, a computer program determines the best further processing of a call depending on the capabilities of offices devices located under the range of the short-range interface.

According to the present invention, this computer program performs "PBX-like" functionality which are re-located in the wireless mobile terminal instead of in a private branch exchange or in a public exchange. Thanks to the knowledge of its environment, the wireless mobile terminal selects a "PBX-like" functionality adapted to its current environment. The term "PBX-like" functionality, covers features like call forwarding to an appropriate office device or to a fax machine or call waiting. A very wide range of such functionality can be imagined all being supported by the method according to the present invention.

This method has the advantage to be more adapted to mobile users since the environment of the wireless mobile terminal change regularly. Moreover, the use of short-range interface, enables it to have very precise information on the environment of the wireless mobile terminal.

Another advantage of the method according to the present invention is to extend considerably the range of "PBX-like" functionality that can be offered to the end-user. Up to now usual PBX functionality as call forwarding, call waiting, call diversion were only possible towards office devices connected to the radio communication network. The method according to the present invention enables it to address stand-alone office devices having a short range communication interface.

Further advantageous features of the invention are defined in the dependent claims.

This invention is based on a priority application EP 01 44 0039 which is hereby incorporated by reference.

BRIEF DESCRIPTION OF THE DRAWINGS

Other characteristics and advantages of the invention will appear on reading the following description of a preferred implementation given by way of non-limiting illustrations, and from the accompanying drawings, in which.

DETAILED DESCRIPTION OF THE INVENTION

Figure 1:
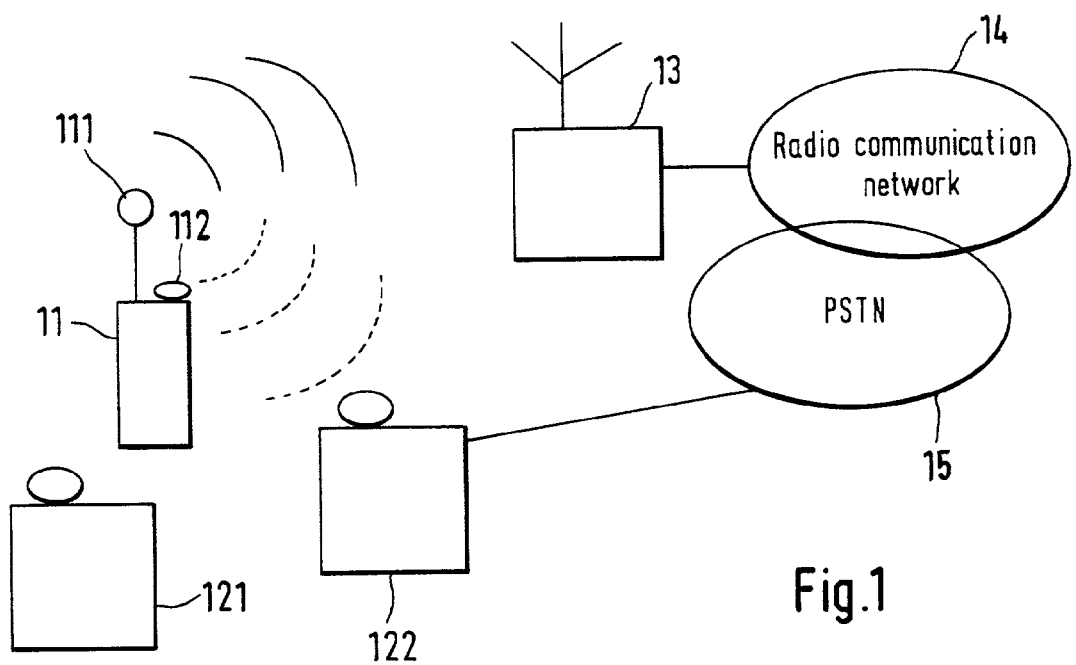
FIG. 1 shows a system where a method according to the invention can be implemented.

FIG. 1 shows a system where a method according to the invention can be implemented. The system comprises a wireless mobile terminal 11, a base station 13 belonging to a radio communication network 14, an device 122 interconnected with the radio communication network 14 over a public switched telephone network (PSTN) 15 and a stand-alone office device 121.

The term office device covers usual devices as a fax machine, a printer, a personal digital assistant, a lap-top, a headset that may be required for further processing a call received at the wireless mobile terminal. A fax machine belongs to office devices connected to the radio communication network. A headset belongs to the group of stand-alone devices. Lap-top, or personal digital assistant and printer could belong to both groups. They can either be stand alone or connected to a radio communication network 14 or to a communication network 15 itself interconnected with the radio communication network 14 This communication network 15 may be a PSTN or a data communication network like the Internet.

Wireless mobile terminal 11 comprises an antenna 111 for communicating over the air interface with base station 13 with the radio communication network 14. Radio communication network 14 is preferably a GSM network or an UMTS network. However, any other radio communication network could also be example for radio communication network 17.

Wireless mobile terminal also comprises a short-range interface 112 for communicating with office devices 121, 122. This interface for short-range communication may be wireless as for example Home RF, Bluetooth both based on radio frequency communication. Also optical communication using infrared may be used over the short-range wireless interface. Standards defined by the Infrared Data Association (IrDa) describes such an Infrared communication. Wired interfaces as USB or R232 can also be envisaged in the framework of the present invention. Wired interfaces reduce however the advantages of the invention.

A communication can be established over the short-range wireless interface if the distance between the wireless mobile terminal and the office device is less than 10 meters for Bluetooth, a further condition for infrared communication is that no obstacle, e.g. walls, are between the office device and the wireless mobile terminal.

According to the invention, wireless mobile terminal 11 transmits over short-range wireless interface 112 an "identification request" message inviting all office devices 121, 122 located within the range of the radio wave to identify themselves. In reply, each office device 121, 122 which has been reached by the "identification request" message, transmits a identification acknowledge message containing an identifier identifying itself unambiguously on the short-range interface 112. In case of a bluetooth short-range interface, the unique 48-bit address can be used for this purpose.

Preferably, the office device 121, 122 also indicates its capability, i.e. the type of calls it is able to handle. The unique 48-bit address can for example follow a predefined format containing a field comprising the type of device. Alternatively, a hand-shake mechanism could be implemented for wireless mobile terminal 11 to ask the device 121, 122 for its type.

Wireless mobile terminal 11 stores the identifiers in a table together with the type of calls each office device can handle.

Upon reception of a call from radio communication network 14, wireless mobile terminal 11 identifies the call type of this call and selects an office device able to handle this type of call.

Examples of possible and non-exhaustive applications of the method according to the invention could be:
1. a fax call received at a mobile terminal is redirected to a fax machine or to a printer under the range of the short range interface.
2. a voice call that should be heard by several persons in a room is redirected to several headsets under the range of the short range interface.
3. a data call, e.g. comprising an e-mail, can be forwarded to a lap-top supporting an e-mail program.

In case of stand-alone office devices 121, e.g. example 2., the data contained in the call are converted in a format compatible with the short range interface 112 and the data are forwarded to the office device 121 over the short range interface 112.

In case of office devices comprising a short range interface and interconnected to the radio communication network 14, e.g. example 1., the call can be forwarded over the short range interface as described for stand-alone devices. Alternatively, the wireless mobile terminal 11 may send a message to the radio communication network containing a command to forward the call to an office device unambiguously identified by its calling number in the radio communication network.

For this purpose the calling number of office device 122 may be communicated to wireless mobile terminal 11 during the identification procedure over short-range interface 112.

Then, the call could be forwarded from the radio communication network 14 to the office device 122 over the PSTN 15 and the connection between wireless mobile terminal 11 and the radio communication network 14 over interface 111 could be released.

In a preferred embodiment, wireless mobile terminal comprises a man-machine-interface for enabling the end-user to select to which office devices the call should be forwarded. This is especially useful in example 2 where the user can select the headsets to which the call should be forwarded. The man-machine-interface may also enable the user to choose how the call should be forwarded to the office device e.g. over the short-range interface or over the radio communication network, encrypted or not and so on.

Figure 2:
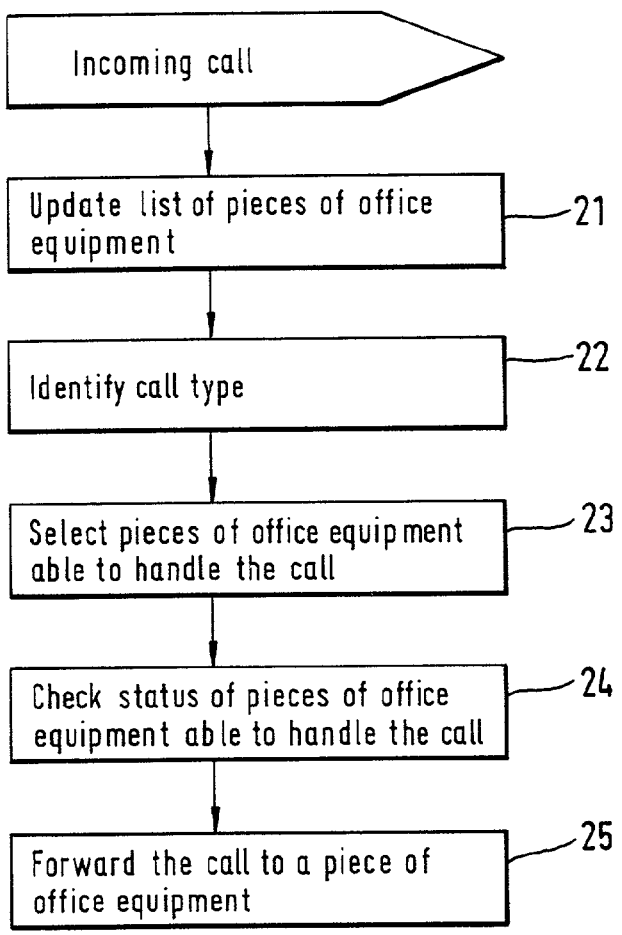
FIG. 2 shows a flow diagram of the method according to the present invention.

FIG. 2 shows a flow diagram of the method according to the present invention comprising steps 21 to 25. These steps are preferably executed each time an incoming call is received from the radio communication network at the wireless mobile terminal.

Step 21 consists in updating the list of office devices located at the proximity of the wireless mobile terminal. At this stage, the usual standardized connection procedure can be used. A message comprising the wireless mobile terminal identifier is issued on the short range interface. This message invites all office devices that receives this message to answer with a message containing their own identifier. Further information as the type of device could be additionally contained in the message. The answers from the office devices are stored in a dynamic table at the wireless mobile terminal. A table entry comprises the office device identifier, the type of this device and the type of calls it is susceptible to handle.

Alternatively, step 21 could be performed independently of the occurrence of an incoming call. This step can be performed at regular time intervals or can be performed on request of the end-user. These alternatives have the advantage not to use too much processing power upon reception of a call. Indeed this step may be long and would delay to much the call.

Step 22 consists in identifying the call type upon reception of an incoming call on the radio interface 111 of the wireless mobile terminal 11. Example for call types can be a voice call a fax call, a data call. The call type can be determined by means of the calling party identifier.

Step 23 consists in selecting in the dynamic table the office device(s) able to handle the type of call identified at step 22.

Step 24 consists in checking the current status of the office device(s) selected at step 23. For this purpose, a request message is addressed to all these office device requesting the status of these devices. The status can be "free" or "busy".

Step 25 consists in forwarding the call to an office device identified as free.

Figure 3:
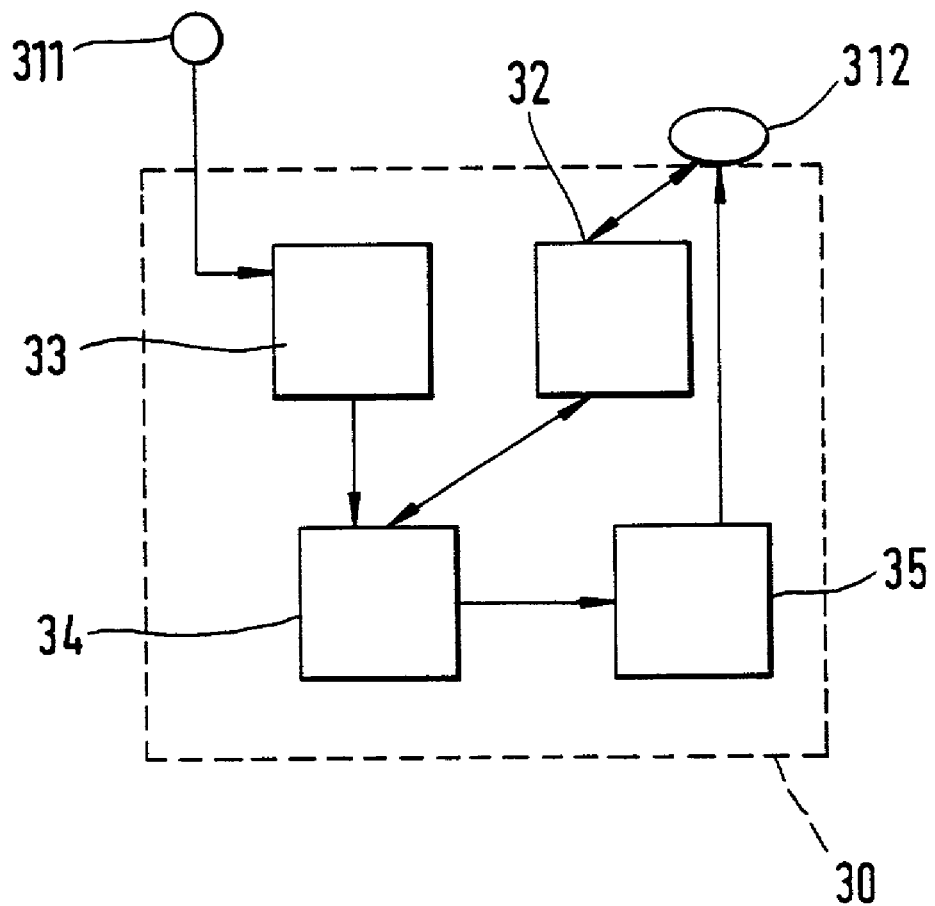
FIG. 3 shows an embodiment of a wireless mobile terminal according to the present invention.

FIG. 3 shows an embodiment of an wireless mobile terminal according to the present invention. Wireless mobile terminal 30 comprises a radio interface 311, a short-range interface 312, a module 32 for identifying office devices located under the range of short-range interface 312, a module 33 for identifying the call type upon reception of an incoming call on radio interface 311, a module 34 for selecting an office device and a module 35 for forwarding a call to an office device.

Radio interface 311 enables the communication between a radio communication network and wireless mobile terminal 30. Short range interface 312 enables the communication between wireless mobile terminal 30 and office devices located under the range of short-range interface 312. The standard used over short-range interface 312 is preferably Bluetooth.

According to the present invention, module 32 for identifying office devices located under the range of short-range interface 312 is used to broadcast "identification request" messages over the short-range interface and to store in a database the identity and the capability of office devices answering the "identification request" messages.

Module 33 for identifying the call type upon reception of an incoming call on radio interface 311 enables it to determine which kind of call is received from the radio communication network. Possible types of call are data call, voice call, fax call. This list is not exhaustive. Module 33 for identifying the type of call is connected to module 34 for selecting an office device able to handle the type of call identified at module 33. Module 34 for selecting an office device generates a request for checking the contends of the database containing the list of office devices. The identity of office devices able to handle the type of call identified at module 33 is returned to module 34 which may select one or more offices devices according to a predefined selection criterion.

Alternatively, module 34 for selecting an office device is connected to a man-machine-interface for enabling a dialog with the end-user. One possibility is to display the office device that has been selected automatically by a computer program located in module 34. Alternatively, the end-user may be asked for selecting on his own one possibility among several possibilities suggested by the computer program located in module 34.

When the selection has been performed module 34 indicates the result of the selection to module 35 for forwarding the incoming call.

Module 35 may comprise a conversion module for converting the information contained in the call in a data format compatible with the short-range interface.

Alternatively, module 35 may generate a message for activating a call forwarding feature in the radio communication network. This is only possible if the office device selected at module 34 is also connected to the radio communication network. In that case, the call forwarding message is transmitted on the radio interface 311 to the radio communication network which takes care of forwarding the call the selected office device and to release the connection to the wireless mobile terminal 30.

In a further embodiment of the present invention, the wireless mobile terminal 30 may have several short range interfaces of different type. (Bluetooth, IrDa, USB) so that module 32 for identifying office devices under the range of the short-range interfaces comprises one list of office devices per short-range interface.

The software for performing the method according to the present invention could be downloaded in the wireless mobile terminal or hard coded in it. In case of a WAP capable wireless mobile terminal, the software should preferably be stored and executed in the WTA Agent.

What is claimed is:

1. A method for handling calls received from a radio communication network at a wireless mobile terminal, said wireless mobile terminal comprising at least one short-range interface for short-range wireless communication with a plurality of office devices located under a range of said short-range interface, said method comprising:

identifying, at said wireless mobile terminal, office devices located under the range of said short-range interface by broadcasting an identification request message over said short range interface and waiting for an answer from said office devices, each of said office devices being adapted to handle at least one call type belonging to a list of predefined call types;

upon reception of a call from said radio communication network at said wireless mobile terminal, said call having a call type belonging to said predefined list, selecting an office device able to handle said call type; and forwarding said call to said office device;

sending from said wireless mobile terminal to said radio communication network a message containing an identifier unambiguously identifying said office device if said office device is interconnected to said radio communication network over a communication network; and forwarding said call from said radio communication network to said office device.

2. The method according to claim 1, wherein said short-range interface is a wireless interface.

3. The method according to claim 1, further comprising releasing the connection between said radio communication network and said wireless mobile terminal after said wireless terminal has sent a message containing said identifier unambiguously identifying said office device to said radio communication network.

4. The method according to claim 1, wherein said selection can be made by the end-user by means of a man-machine interface provided on said wireless mobile terminal.

5. A wireless mobile terminal comprising:
- a radio interface to access to a radio communication network;
- at least one short range interface for short-range wireless communication with a plurality of office devices under a range of said short-range interface;
- a module for identifying office devices located under the range of said short-range interface each being adapted to handle at least one call type belonging to a list of predefined call types;
- a module for selecting, upon reception of a call, having a certain call type, from said radio communication network, at least one office device susceptible to handle said call type; and
- a module for activating a call forwarding to said selected office device in said radio communication network if said selected office device is interconnected to said radio communication network over a communication network.

6. A computer program comprising computer program code means adapted to perform a method for handling calls received from a radio communication network at a wireless mobile terminal, said wireless mobile terminal comprising at least one short-range interface for short-range wireless communication with a plurality of office devices located under a range of said short-range interface, said computer program being stored in a wireless mobile terminal comprising a first radio interface and a second short range interface of communicating with office devices located under the range of said short-range interface, said method comprising:

identifying, at said wireless mobile terminal, office devices located under the range of said short-range interface by broadcasting an identification request message over said short range interface and waiting for an answer from said office devices, each of said office devices being adapted to handle at least one call type belonging to a list of predefined call types;

upon reception of a call from said radio communication network at said wireless mobile terminal, said call having a call type belonging to said predefined list, selecting an office device able to handle said call type; and forwarding said call to said office device;

sending from said wireless mobile terminal to said radio communication network a message containing an identifier unambiguously identifying said office device if said office device is interconnected to said radio communication network over a communication network; and forwarding said call from said radio communication network to said office device.

* * * * *